United States Patent
Tsuji

(10) Patent No.: US 9,065,941 B2
(45) Date of Patent: Jun. 23, 2015

(54) IMAGE PROCESSING APPARATUS AND METHOD FOR CONTROLLING THE SAME

(71) Applicant: CANON KABUSHIKI KAISHA, Tokyo (JP)

(72) Inventor: Hiroyuki Tsuji, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/949,094

(22) Filed: Jul. 23, 2013

(65) Prior Publication Data
US 2014/0029040 A1   Jan. 30, 2014

(30) Foreign Application Priority Data

Jul. 25, 2012 (JP) .................. 2012-164609

(51) Int. Cl.
| H04N 1/00 | (2006.01) |
| G11B 21/02 | (2006.01) |
| G06F 1/26 | (2006.01) |
| G06F 1/32 | (2006.01) |
| G06F 11/30 | (2006.01) |

(52) U.S. Cl.
CPC .............. *H04N 1/00339* (2013.01); *G06F 1/26* (2013.01); *H04N 1/00* (2013.01); *G06F 1/3268* (2013.01); *G06F 11/30* (2013.01); *H04N 1/00901* (2013.01); *H04N 1/00912* (2013.01); *H04N 2201/0094* (2013.01); *Y02B 60/1246* (2013.01)

(58) Field of Classification Search
None
See application file for complete search history.

(56) References Cited

U.S. PATENT DOCUMENTS

| 6,229,663 B1 * | 5/2001 | Yoneda et al. .................. 360/75 |
| 6,982,842 B2 * | 1/2006 | Jing et al. ........................ 360/31 |
| 7,543,178 B2 * | 6/2009 | McNeill et al. .............. 714/6.21 |
| 7,570,449 B2 * | 8/2009 | Lee et al. ........................ 360/75 |
| 8,089,886 B1 * | 1/2012 | Rahman ........................ 370/242 |

FOREIGN PATENT DOCUMENTS

JP   2008-251129 A   10/2008

* cited by examiner

*Primary Examiner* — K. Wong
(74) *Attorney, Agent, or Firm* — Canon U.S.A., Inc., IP Division

(57) ABSTRACT

An information processing apparatus includes a hard disk unit, a control unit configured to output an instruction to retract a head of the hard disk unit, a monitoring unit configured to monitor a state of the control unit and output, in a case where the monitoring unit determines that the control unit cannot issue the instruction, an instruction to retract the head of the hard disk unit, and a hard disk controller configured to receive the instruction from the control unit or the monitoring unit and to issue a command for retracting the head of the hard disk unit to the hard disk unit. The hard disk unit retracts the head of the hard disk unit in a case where the hard disk unit receives the command.

8 Claims, 8 Drawing Sheets

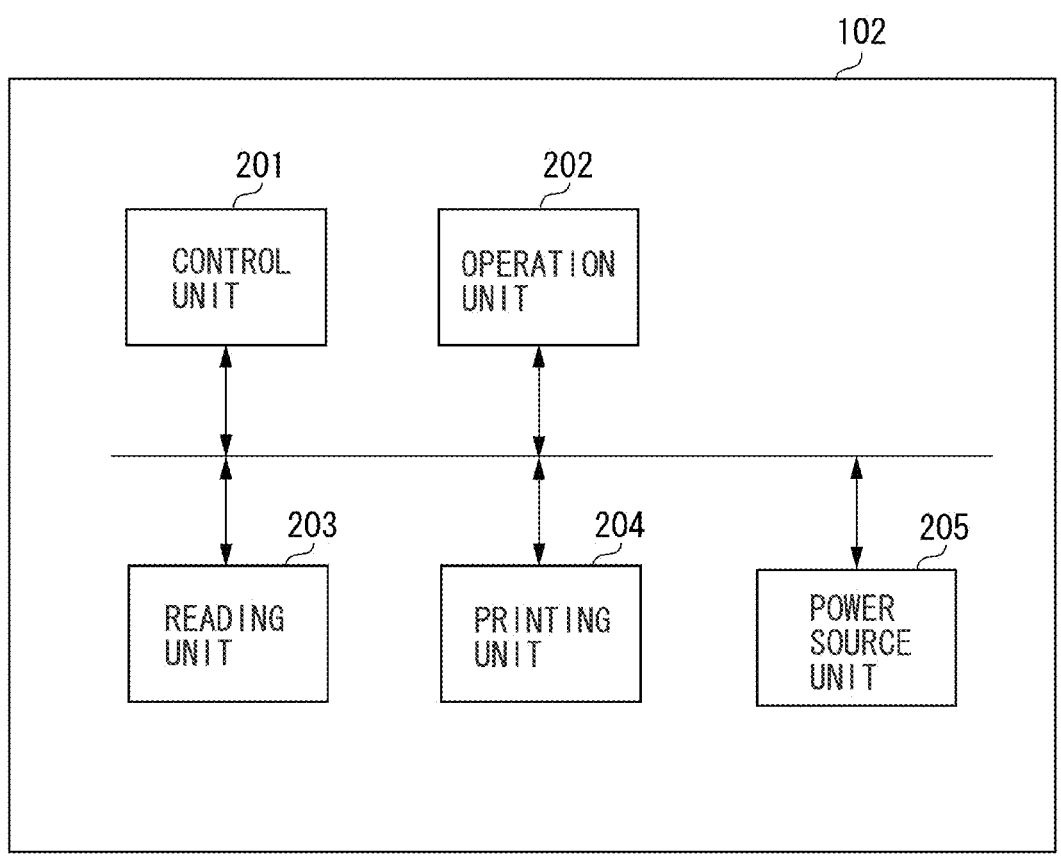

IMAGE PROCESSING APPARATUS AND METHOD FOR CONTROLLING THE SAME

BACKGROUND OF THE INVENTION

1. Field of the Invention

The present invention relates to an information processing apparatus that includes a hard disk unit, and a method for controlling the same.

2. Description of the Related Art

In an information processing apparatus such as a multifunction periphery (MFP), large volumes of data are processed to be stored by using a magnetic storage unit, namely, a hard disk drive (HDD). The HDD mainly includes a disk that is a magnetic recording medium and a head for performing reading or writing.

In the HDD, the head is moved through gaps with the disk rotated at a high speed to access the disk, thus enabling the data to be randomly read or written at a high speed. However, when power is turned OFF or shocks are applied during the access to the disk by the head, the head or the disk of the HDD may be flawed or damaged. The HDD may not be normally activated, creating problems such as easy failures and a short life.

Normally, to control a operation of the HDD, a predetermined command is transmitted from a HDD controller to the HDD. For example, a STANDBY command of Advanced Technology Attachment (ATA), which is a HDD interface standard, is for writing data present in a HDD internal cache to the HDD, retracting the head to a safe position, and stopping rotation of the disk.

To execute such a command, a central processing unit (CPU) normally sets execution of a predetermined instruction for the HDD controller, and the HDD controller converts the instruction into a predetermined command to transmit it to the HDD.

In the information processing apparatus including such a HDD, control is performed to reduce failures of the HDD by forming a structure having resistance to vibrations or transmitting a command such as STANDBY before the power of the HDD is turned OFF.

For example, in a technology discussed in Japanese Patent Application Laid-Open No. 2008-251129, control is performed to detect falling of the HDD by an acceleration sensor and retract the head before the HDD receives any shocks.

However, such an information processing apparatus has a problem, specifically, a possibility that the CPU (controller) for controlling the information processing apparatus will not be able to transmit any commands to the HDD due to hungup.

SUMMARY OF THE INVENTION

The present invention is directed to a mechanism for enabling a HDD to perform specific processing unchanged from that at the time of a normal end even when a controller for controlling the hard disk is changed to a non-normal state.

According to an aspect of the present invention, an information processing apparatus includes a hard disk unit, a control unit configured to output an instruction to retract a head of the hard disk unit, a monitoring unit configured to monitor a state of the control unit and output, in a case where the monitoring unit determines that the control unit cannot issue the instruction, an instruction to retract the head of the hard disk unit, and a hard disk controller configured to receive the instruction from the control unit or the monitoring unit and to issue a command for retracting the head of the hard disk unit to the hard disk unit. The hard disk unit retracts the head of the hard disk unit in a case where the hard disk unit receives the command.

Further features and aspects of the present invention will become apparent from the following description of exemplary embodiments with reference to the attached drawings.

BRIEF DESCRIPTION OF THE DRAWINGS

FIG. 2 is a block diagram illustrating a configuration of the information processing apparatus.

DESCRIPTION OF THE EMBODIMENTS

Various exemplary embodiments, features, and aspects of the invention will be described in detail below with reference to the drawings.

System Configuration

Figure 1:
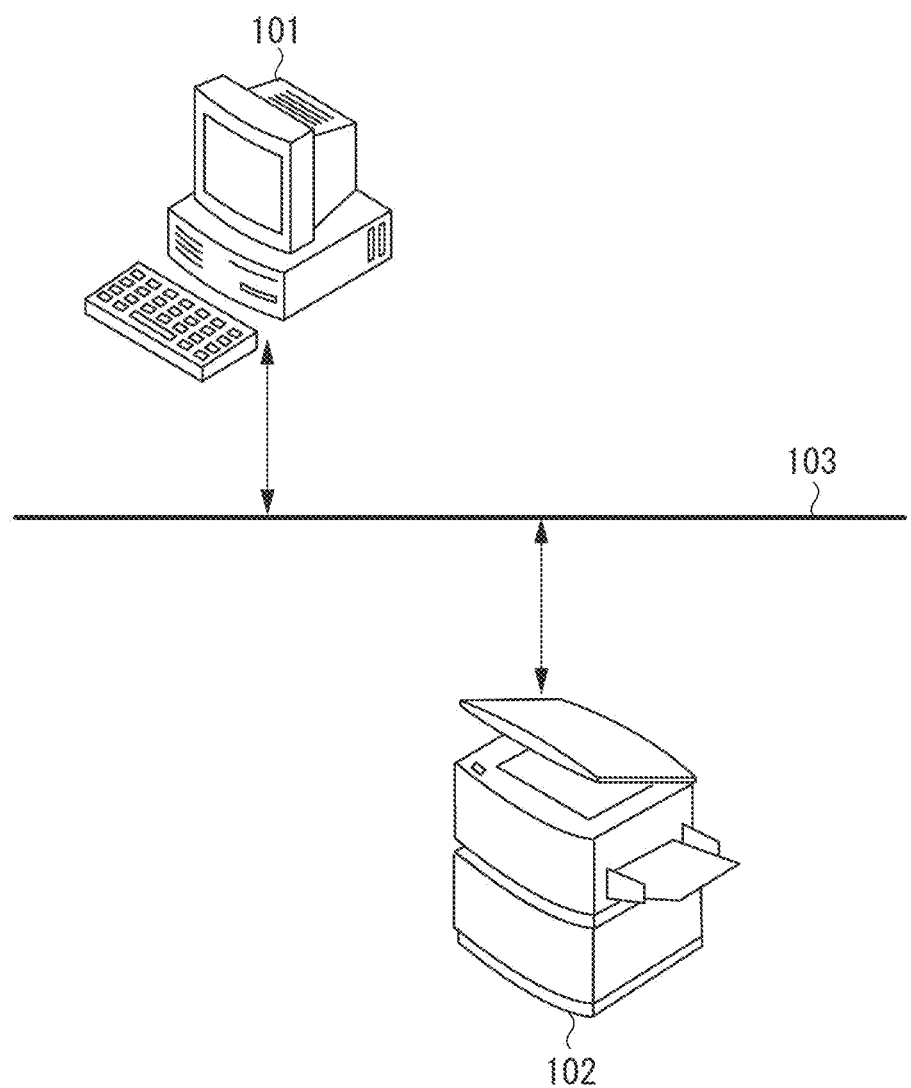
FIG. 1 is a diagram illustrating an image processing system to which an information processing apparatus is applied.

A first exemplary embodiment will be described. FIG. 1 illustrates an example of an image processing system to which an information processing apparatus of the present exemplary embodiment is applied. In this example, the information processing apparatus is configured with a composite device such as a multifunction printer (MFP), and the MFP can communicate with an external personal computer (PC) via a network. The information processing apparatus includes a printer apparatus, a facsimile apparatus, a scanner, and a data transmission/reception apparatus.

In FIG. 1, the PC 101 includes hardware for communication with the MFP 102, and driver tools (printer driver and scanner driver). The PC 101, which has personal computer's hardware and software resources, performs data processing. The software resources include an operating system (OS) for managing applications.

The present exemplary embodiment is directed to a case where the PC 101 and the MFP 102 are interconnected via the network 103. However, the present invention can be applied to a system where the PC and the MFP are locally interconnected via a universal serial bus (USB) interface. FIG. 2 is a block diagram illustrating a configuration of the information processing apparatus according to the present exemplary embodiment. Specifically, FIG. 2 illustrates a configuration example of the MFP102 illustrated in FIG. 1.

In FIG. 2, a control unit 201 controls each unit of the MFP 102. For details on the control unit 201, an operation unit 202 includes a display portion and an input portion, an operation screen of the MFP 102 is provided to a user through the display portion, and various operations to the MFP 102 are received from the user through the input portion.

The operation unit 202 includes a switch for transferring a state between a power-saving state or a sleep state and a standby state. A reading unit 203 reads a document, and converts the read data into image data to input it to the control unit 201. A printing unit 204 performs image formation on an output sheet based on the image data subjected to image processing by the control unit 201. A power source unit 205 supplies power to the control unit 201, the operation unit 202, the reading unit 203, and the printing unit 204 of the MFP 102.

Figure 3A:
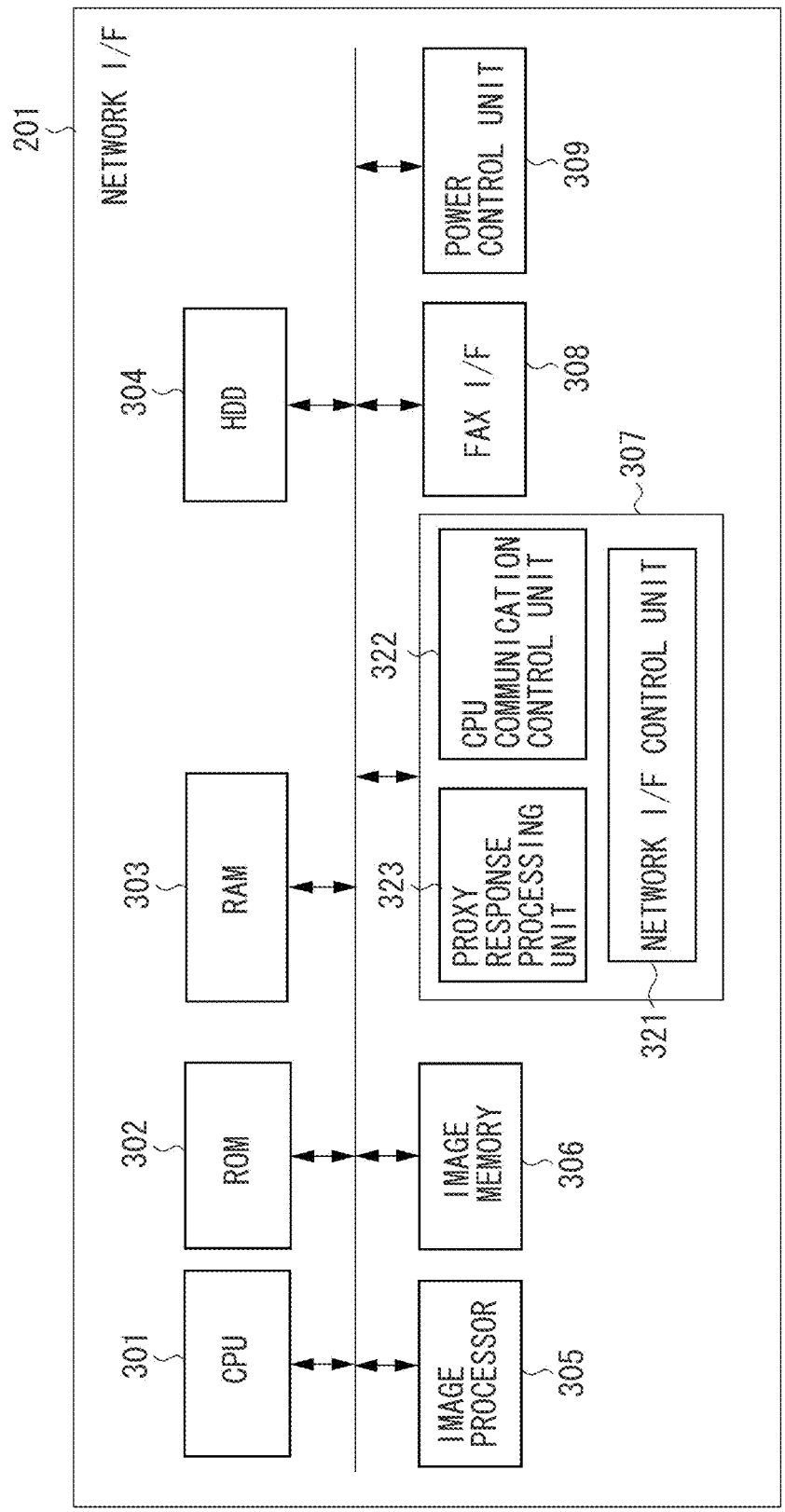
FIG. 3A is a block diagram illustrating a detailed configuration of a control unit illustrated in FIG. 2.

FIG. 3A is a block diagram illustrating a detailed configuration of the control unit 201 illustrated in FIG. 2. In FIG. 3A, a CPU 301 controls each operation unit 202, the reading unit 203, the printing unit 204, and the power source unit 205 of the MFP 102 based on a program developed in the RAM 303. Similarly, the CPU 301 controls a ROM 302, a RAM 303, a HDD 304, an image processor 305, an image memory 306, a network interface (I/F) 307, a FAX I/F 308.

The ROM 302 stores a boot program executed by the CPU 301. In the RAM 303, an OS, an application program, or job data executed by the CPU 301 is developed from a HDD 304. The HDD 304 stores the OS, the application program, or the job data executed by the CPU 301. The HDD 304, which is compliant with a serial ATA (SATA) interface standard, transmits or receives various corresponding commands to operate. Especially, before power of the HDD 304 is turned OFF, a command such as STANDBY is received, so that the power can be safely turned OFF. In the present exemplary embodiment, the HDD 304 is configured as a storage unit for storing information including a program. The HDD 304 includes a disk storage medium for storing data, and a magnetic head for reading/writing data from/in the disk storage medium.

Figure 3B:
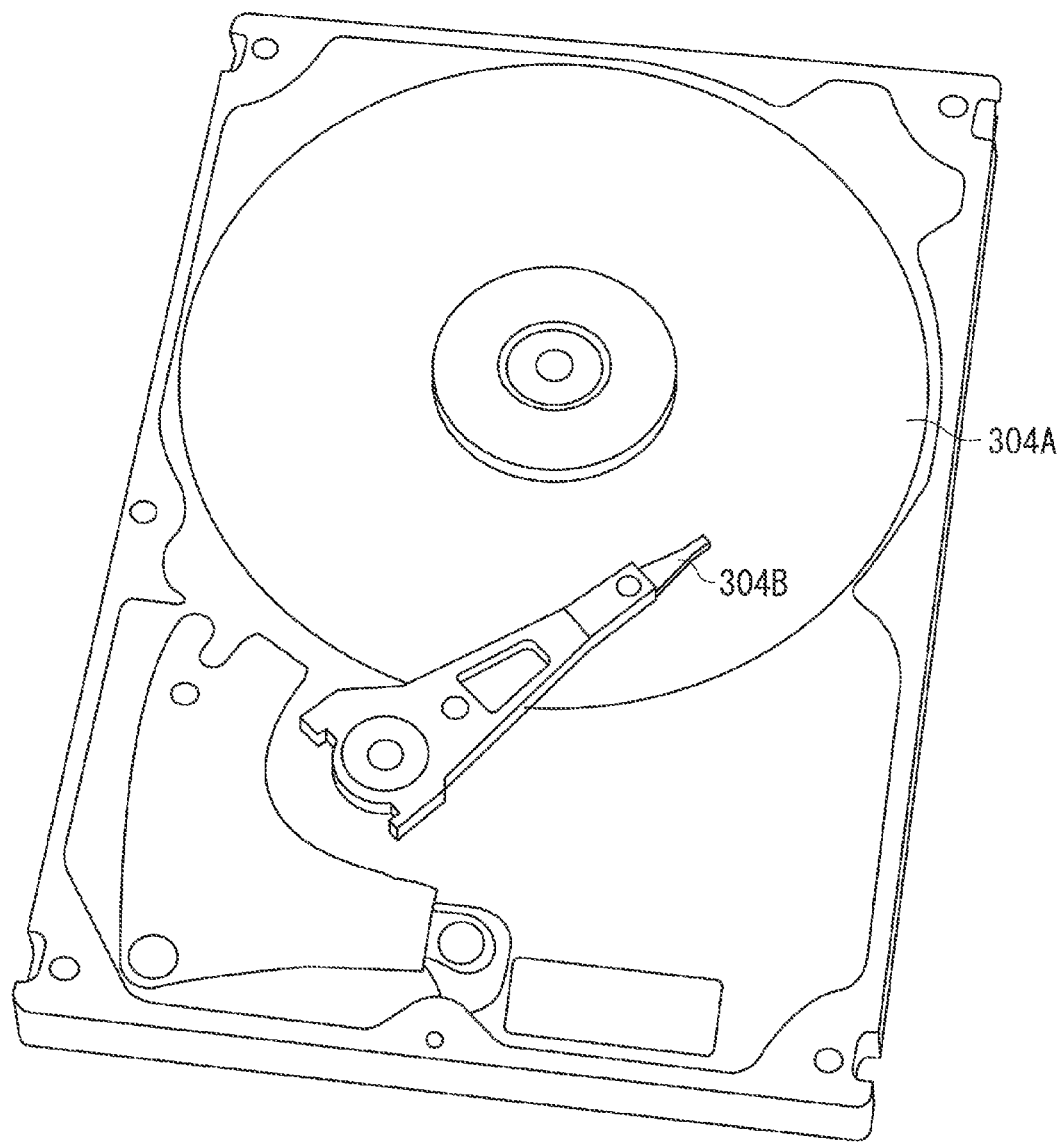
FIG. 3B is a photographic depiction illustrating a detailed configuration of a HDD illustrated in FIG. 3A.

FIG. 3B illustrates a detailed configuration of the HDD 304 illustrated in FIG. 3A. In FIG. 3B, a disk (hard disk) 304A is configured by stacking a plurality of disks at predetermined intervals. A head 304B accesses, according to a writing, reading or deleting instruction from the HDD controller, a specific sector to perform information writing or reading processing. The head 304B is controlled, according to the STANDBY command of the ATA that is a HDD interface standard, to write data present in a HDD internal cache in the HDD, be retracted to a safe position so that rotation of the disk 304A can be stopped. For example, when the power is turned OFF during writing to the HDD 304, inconsistency of writing to the HDD 304 occurs, creating a possibility of a logical error of the HDD 304 at the time of next start up. The power turning-OFF during the writing to the HDD 304 may give physical damage, creating a possibility of a shorter operation life of the HDD 304.

The image processor 305 performs various image processes for image data stored in the image memory 306. The image memory 306 temporarily stores the image data input from the reading unit 203 or the network I/F.

The network I/F 307 inputs/outputs image data from an external apparatus such as the PC 101, or responses to an inquiry. The network I/F 307 includes a network I/F control unit 321, a CPU communication control unit 322, and a proxy response processing unit 323.

The network I/F control unit 321 controls transmission/reception of a packet via the network. The CPU communication control unit 322 performs data transmission/reception with the CPU 301. The network I/F control unit 321 always understands whether the MFP is a normal power state where the MFP is normally started up or a sleep state. When the MFP is operating in the normal power state, the network I/F control unit 321 transfers the packet received from the network to the CPU 301. When the MFP is operating in the sleep state, the network I/F control unit 321 transfers the packet received from the network to the proxy response processing unit 323.

The FAX I/F 308 inputs/outputs data through a public line (not illustrated). A power control unit 309 switches a power supply state from the power source unit 205 to the components 201 to 204 of the MFP 102 or the components 301 to 308 of the control unit 201.

Figure 4:
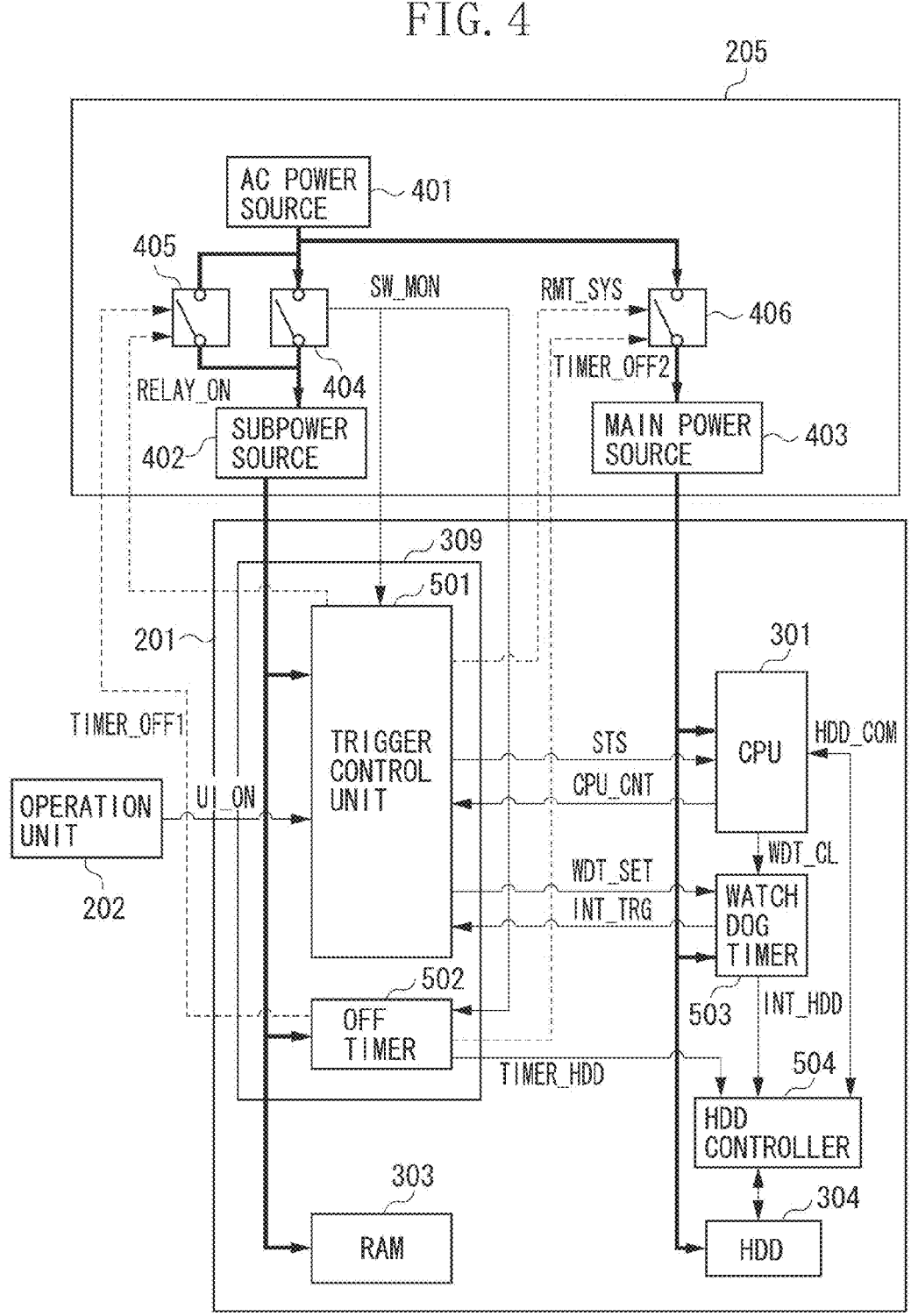
FIG. 4 is a block diagram illustrating a configuration of power supply control in the information processing apparatus.

FIG. 4 is a block diagram illustrating a configuration of power supply control in the information processing apparatus according to the present exemplary embodiment. Specifically, FIG. 4 illustrates a power supply state to each component of the power source unit 205, power supply control to each component of the CPU 301 or the power control unit 309, and signal control. In FIG. 4, a thick solid-line arrow indicates power supply, and a dotted-line arrow indicates power supply control.

In the power source unit 205 illustrated in FIG. 4, an alternating current (AC) power source 401 supplies power to a sub power source 402 via a relay switch 404 and a relay switch 405. The AC power source 401 supplies power to a main power source 403 via a relay switch 406. The sub power source 402 supplies power to each component of the power control unit 309 and the RAM 303.

The relay switch 404 can be switched ON/OFF by the user. A SW_MON signal is output to a trigger control unit 501 according to turning-ON/OFF of the relay switch 404. Turning-ON/OFF of the relay switch 405 is switched according to a RELAY_ON signal of the trigger control unit 501.

The main power source 403 supplies power to the CPU 301 or the HDD 304. Turning-ON/OFF of the relay switch 406 is switched according to a RMT_SYS signal of the trigger control unit 501. The main power source 403 also supplies power to, other than the circuits to which the power is supplied from the sub power source 402, each control unit 201, the operation unit 202, the reading unit 203, and the printing unit 204 of the MFP 102, and the components 301 to 308 of the control unit 201.

In the control unit 201, the trigger control unit 501 detects a signal input from the CPU 301, the operation unit 202, and the relay switch 404. The control unit 201 controls the RELAY_ON signal and the RMT_SYS signal to cause the relay switches 405 and 406 to be switched ON/OFF.

The CPU 301 controls the trigger control unit 501 according to a CPU_CNT signal, and receives a STS signal that is a status signal of the trigger control unit 501. The CPU 301 transmits/receives read/write data to/from. the HDD 304 via the HDD controller, and a command for controlling the operation of the HDD. Further, the CPU 301 transmits a WDT_CL signal to the watch dog timer 503.

The watch dog timer 503 monitors abnormality such as hung-up of the CPU 301. The watch dog timer 503 is a timer circuit that includes a down counter. The counter is started by a WDT_SET signal from the trigger control unit 501, and cleared by the WDT_CL signal of the CPU 301. The watch dog timer 503 performs first detection processing for detecting within a predetermined time whether a state of the CPU 301 has changed from a normal state to a non-normal state, and second detection processing for detecting completion of end processing within a predetermined time when the power is transferred from an ON state to an OFF state by the relay switch 406 described below.

In the present exemplary embodiment, the information processing apparatus includes, for example, a counter for measuring 10 seconds. When the counter is not cleared by the WDT_CL signal, an interruption signal INT_TRG is output to the trigger control unit 501. Further, an INT_HDD signal is output to the HDD controller 504. In other words, when the CPU 301 cannot output any WDT_CL signal within every 10 seconds due to a problem such as hung-up, the interruption signal INT_TRG and the INT_HDD signal are output. The HDD controller 504 controls writing or reading of information to/from the storage unit.

The HDD controller 504, which functions as a storage control unit, transmits/receives a command to/from the CPU 301, and converts the command into a SATA command to transmit/receive it to/from the HDD 304. When a TIMER_HDD signal is received from an OFF timer 502 or the INT_HDD signal is received from the watch dog timer 503, the HDD controller 504 transmits a specific command to the HDD 304. In this case, the CPU 301 is not involved. For example, in the present exemplary embodiment, the power can be safely turned OFF for the HDD 304 by transmitting the STANDBY command to the HDD 304.

The OFF timer 502 starts a timer by a SW_MON signal when the relay switch 404 is turned OFF. Each signal is output after the passage of predetermined time. In the present exemplary embodiment, a TIMER_HDD (timer 1) is output about 60 seconds after the timer start, and a TIMER_OFF 1 signal and a TIMER_OFF 2 signal (timer 2) are output about 90 seconds after the timer start.

Figure 5:
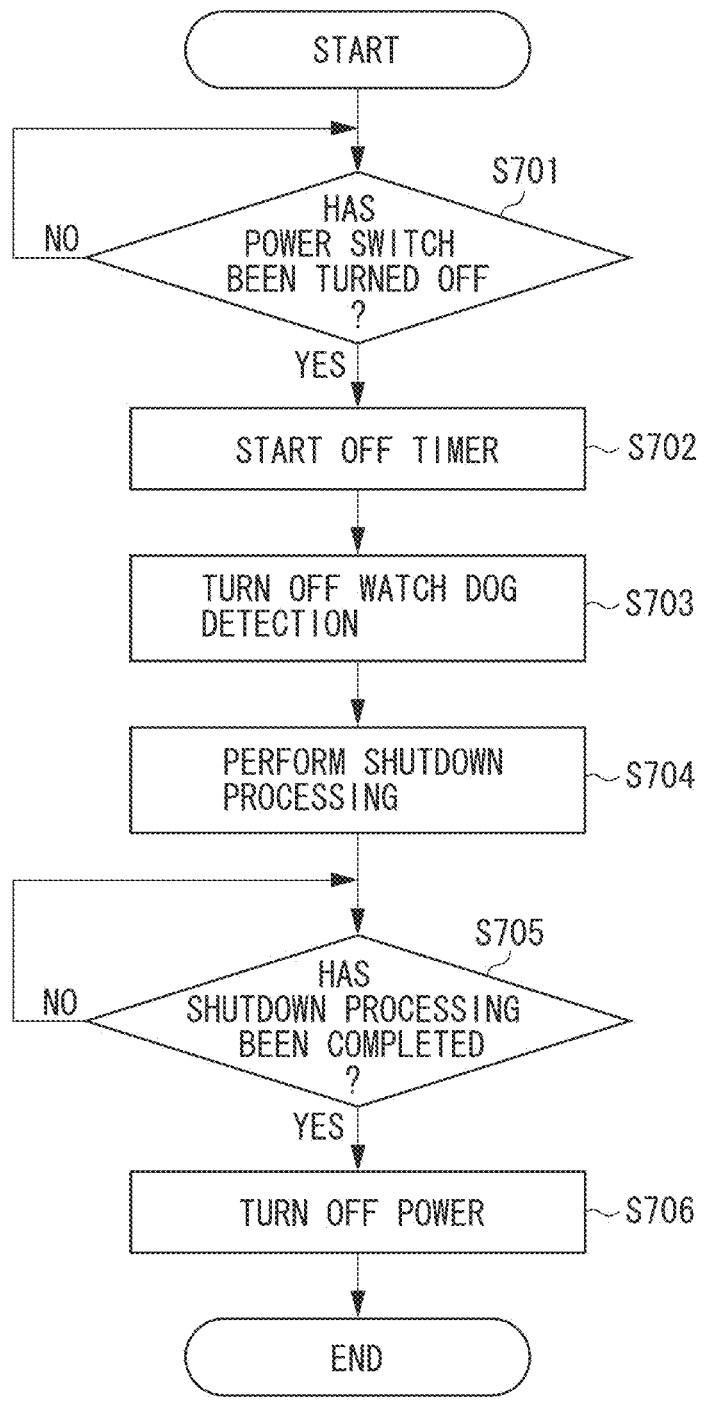
FIG. 5 is a flowchart illustrating a method for controlling the information processing apparatus.

FIG. 5 is a flowchart illustrating a method for controlling the information processing apparatus according to the present exemplary embodiment. The exemplary embodiment is directed to a processing example where after the relay switch 404 has been turned OFF during the start-up of the MFP 102, the apparatus normally shuts down without hang-up of the CPU 301. Each step is executed by the trigger control unit 501 of the power control unit 309.

When the relay switch 404 is turned OFF during the start-up (during operation or standby state) of the MFP 102 (YES in step S701), in step S702, the SW_MON signal illustrated in FIG. 4 is input to the OFF timer 502 of the control unit 201, and the OFF timer 502 starts time counting processing. The SW_MON signal is also input to the trigger control unit 501 of the control unit 201. In step S703, the trigger control unit 501 stops the watch dog timer 503 by setting a WDT_SET signal inactive.

In step S704, the trigger control unit 501 outputs a STS signal to the CPU 301, and the CPU 301 performs shutdown processing. In the shutdown processing, a job being executed is cancelled to perform processing that enables normal turning-OFF of power. When there is data unwritten to the HDD 304, the writing is completed, and the CPU 301 transmits a command such as STANDBY to the HDD 304 via a HDD_COM signal, thereby enabling safe turning-OFF of power for the HDD 304.

When the shutdown processing normally ends (YES in step S705), the CPU 301 transmits a CPU_CNT signal to the trigger control unit 501. In step S706, the trigger control unit 501 stops power supply from the sub power source 402 and the main power source 403 by controlling a RELAY_ON signal and a RMT_SYS signal. The shutdown processing is normally completed within about 30 seconds in a normal case.

Thus, in the normal shutdown flow, the CPU 301 performs shutdown processing at the time of power-OFF, and transmits a command signal to the HDD 304 to set it in a sleep state. As a result, the power is safely turned OFF without causing any errors of the HDD 304 or giving any damage.

Next, an operation flow when the relay switch 404 of the MFP 102 is turned ON and the CPU 301 hangs up after start-up will be described.

Figure 6:
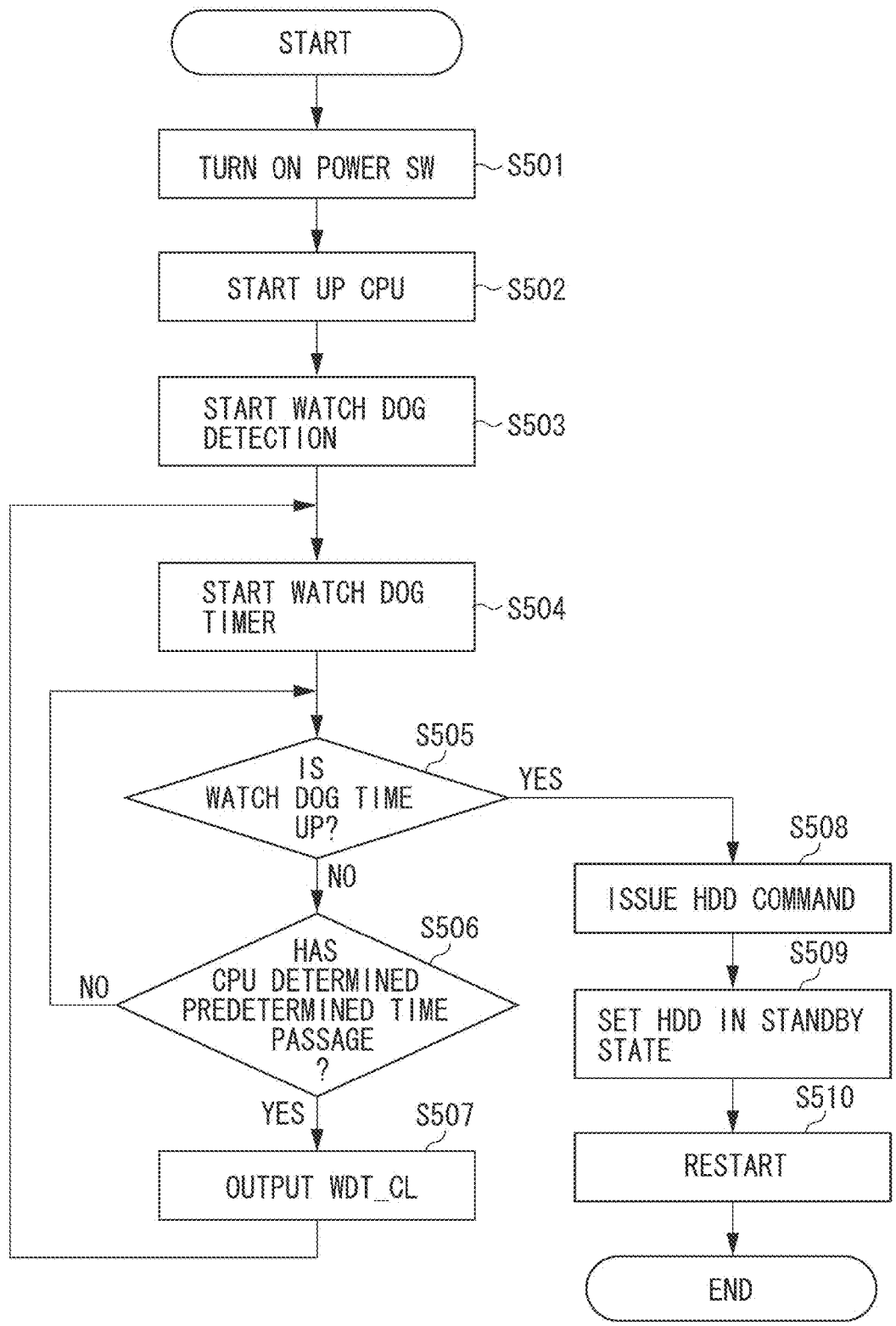
FIG. 6 is a flowchart illustrating a method for controlling the information processing apparatus.

FIG. 6 is a flowchart illustrating a method for controlling the information processing apparatus according to the present exemplary embodiment. This is a processing example where the relay switch 404 of the MFP 102 is turned ON and the CPU 302 hangs up after start-up. Each step is executed by the trigger control unit 501 of the power control unit 309.

In step S501, the relay switch 404 of the MFP 102 is turned ON. In step S502, power is supplied to the sub power source 402, thereby causing the trigger control unit 501 to output a RMT_SYS signal, and power is supplied to the main power source 403, thereby starting up the CPU 301.

Then, in step S503, the trigger control unit 501 outputs a WDT_SET signal to the watch dog timer 503 to start watch dog detection. In step S504, the watch dog timer 503 is started. When the watch dog timer counts, for example, 10 seconds, and time is not up (NO in step S505), in step S506, the CPU 301 determines whether a predetermined time (e.g., 9 seconds) has elapsed.

When it is determined that the predetermined time has not elapsed (NO in step S506), the CPU 301 performs time-up determination of the watch dog timer 503 again. When it is determined that the predetermined time has elapsed (YES in step S506), in step S507, the CPU 301 outputs a WDT_CL signal to clear the watch dog timer 503. Then, the CPU 301 continuously clears the watch dog timer 503, for example, for every 9 seconds.

On the other hand, when the CPU 301 cannot output any WDT_CL signal to the watch dog timer 503 (after the passage of predetermined time), the watch dog timer 503 performs time-up of, for example, 10 seconds (YES in step 505). In step S508, an INT_HDD signal is transmitted from the watch dog timer 503 to the HDD controller 504, and the HDD controller 504 outputs a STANDBY command to the HDD 304.

In step S509, the HDD 304 retracts the head to be set in a standby state that enables normal turning-OFF of power. Then, in step S510, the trigger control unit 501 changes the RMT_SYS signal by the INT_TR signal output from the watch dog timer 503 to change the power of the main power source 403 from OFF to ON, and restarts the CPU 301.

Thus, when the CPU 301 hangs up, and is restarted, by forcibly setting the HDD 304 in the standby state, the power can be safely turned OFF without causing any error of the HDD 304 or giving any damage.

A second exemplary embodiment will be described. The first exemplary embodiment has been directed to the operation flow when the relay switch 404 of the MFP 102 is turned ON and the CPU 301 hangs up after the start-up. The second exemplary embodiment is directed to a detailed processing flow when a CPU 301 hangs up after a relay switch 404 is turned OFF during start-up of a CPU 301.

Figure 7:
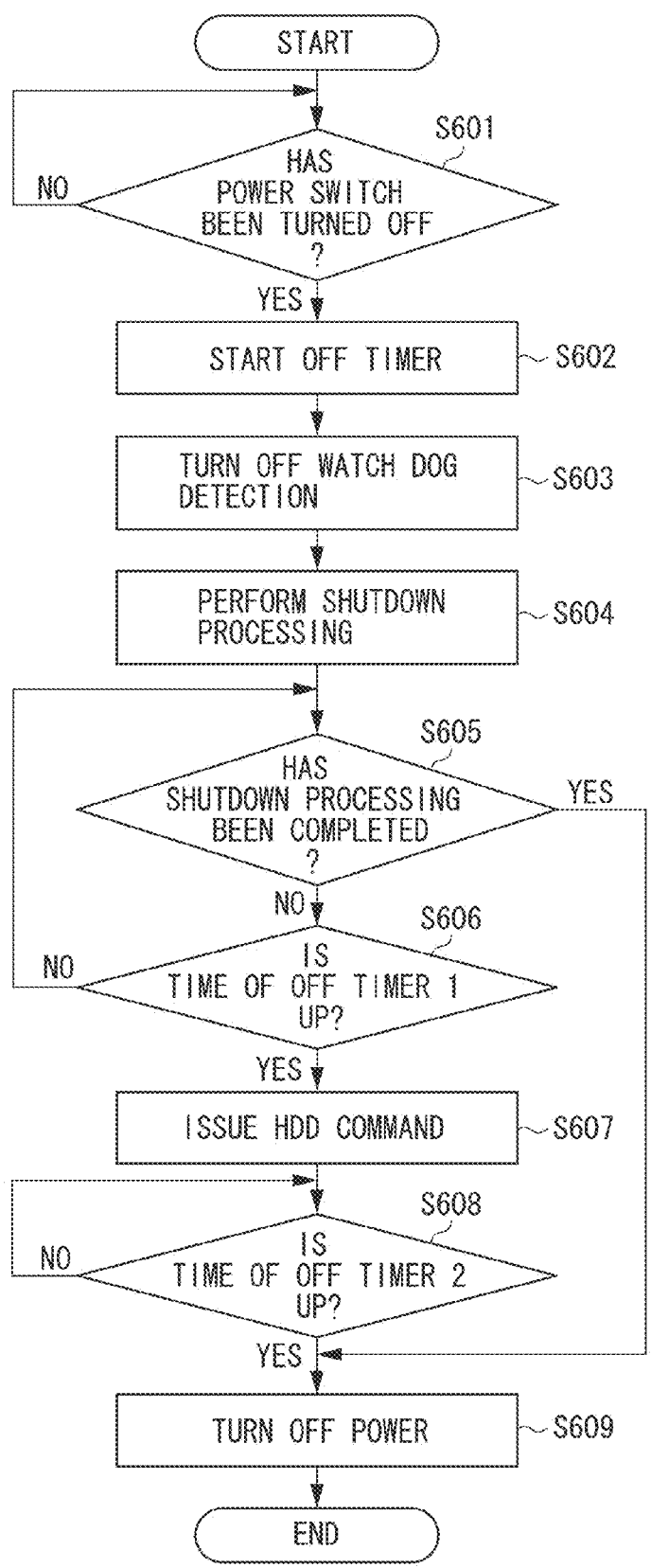
FIG. 7 is a flowchart illustrating a method for controlling the information processing apparatus.

FIG. 7 is a flowchart illustrating a method for controlling an information processing apparatus according to the present exemplary embodiment. This is a processing example where the relay switch 404 of the MFP 102 is turned OFF and the CPU 301 hangs up after start-up. When the relay switch 404 is turned OFF during the start-up (during operation or standby state) of the MFP 102 (YES in step S601), in step S602, a SW_MON signal is input from the relay switch 404 to an OFF timer 502 to be started. The SW_MON signal is also input to a trigger control unit 501. In step S603, the trigger control unit 501 stops a watch dog timer 503 by setting a WDT_SET signal inactive.

In step S604, the trigger control unit 501 outputs a STS signal to the CPU 301, and the CPU 301 performs shutdown processing. In the shutdown processing, a job being executed is cancelled to perform processing that enables normal turning-OFF of power. When there is data unwritten to a HDD 304, the writing is completed, and the CPU 301 transmits a command such as STANDBY to the HDD 304 via a HDD COM signal, thereby enabling safe turning-OFF of power for the HDD 304.

When the shutdown processing normally ends (YES in step S605), the CPU 301 transmits a CPU_CNT signal to the trigger control unit 501. In step S609, the trigger control unit 501 stops power supply from a sub power source 402 and a main power source 403 by controlling a RELAY_ON signal and a RMT_SYS signal. The shutdown processing is normally completed within about 30 seconds in a normal case.

When the shutdown processing is not completed (NO in step S605) or time of the OFF timer 502 is not up, the shutdown processing is continued until it is completed.

When the shutdown processing is not completed due to hang-up of the CPU 301 (NO in step S605), and time of a timer 1 of the OFF timer 502 is up for, for example, 60 seconds (YES in step S606), the following processing is performed. Specifically, the OFF timer 502 outputs a TIMER_HDD signal, and a HDD controller transmits a STANDBY command to the HDD 304.

Thus, power for the HDD 304 can be safely turned OFF. When time of a timer 2 of the OFF timer 502 is up for 90 seconds (YES in step S608), a TIMER_OFF 1 signal is output to the relay switch 405, and a TIMER_OFF 2 signal is output to the relay switch 406. Thus, in step S609, power supply of the sub power source and the main power source 403 is stopped, and the processing ends.

Thus, when the CPU 301 hangs up at the time of power-OFF, the HDD304 is forcibly set in a sleeps state. As a result, the power can be safely turned OFF without causing any errors of the HDD 304 or giving any damage.

A third exemplary embodiment will be described. In the first and second exemplary embodiments, when the CPU 301 hangs up, the STANDBY command is transmitted to the HDD 304. However, another command or a unit can be employed as long as failures of the HDD 304 can be reduced and power can be safely turned OFF.

The present invention can be applied to a system that includes a plurality of devices (e.g., host computer, interface device, reader, and printer) or an apparatus (e.g., copying machine or facsimile) that includes one device. The object of the present invention can also be achieved by supplying a storage medium storing program codes for realizing the functions of the exemplary embodiments to the system or the apparatus, and reading and executing the program codes stored in the storage medium by a computer of the system or the apparatus. In this case, the program codes themselves read from the storage medium realize the functions of the exemplary embodiments, and the program codes themselves and the storage medium storing the program codes are within the present invention.

The present invention includes a case where the OS on the computer performs some or all parts of actual processing based on instructions of the program codes, thereby realizing the functions of the exemplary embodiments. Further, the present invention is applied to a case where the program codes read from the storage medium are written in a memory included in a function extension card inserted into the computer or a function extension unit connected to the computer. In this case, a CPU included in the function extension card or the function extension unit performs some or all parts of actual processing based on the instructions of the written program codes, thereby realizing the functions of the exemplary embodiments.

Each step of the present invention can be achieved by executing software (program) obtained via a network or various storage media by a processing apparatus (CPU or processor) such as a PC.

The present invention is not limited to the exemplary embodiments. Various changes (including organic combinations of exemplary embodiments) can be made based on the spirit of the invention, and should not be excluded from the scope of the invention.

According to the present invention, even when the controller for controlling the HDD changes to a non-normal state, specific processing unchanged from that at the time of a normal end can be executed for the HDD.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-164609 filed Jul. 25, 2012, which is hereby incorporated by reference herein in its entirety.

What is claimed is:

1. An information processing apparatus comprising:
a hard disk unit;
a control unit configured to output an instruction to retract a head of the hard disk unit;
a monitoring unit configured to monitor a state of the control unit and output, in a case where the monitoring unit determines that the control unit is in a state where the instruction to retract the head of the hard disk unit cannot be output, an instruction to retract the head of the hard disk unit; and
a hard disk controller configured to receive the instruction from the control unit or the monitoring unit and to issue a command for retracting the head of the hard disk unit to the hard disk unit in a case where the hard disk controller receives the instruction from the control unit or the monitoring unit,
wherein the hard disk unit retracts the head of the hard disk unit in a case where the hard disk unit receives the command.

2. The information processing apparatus according to claim 1, wherein the monitoring unit is a timer configured to count predetermined time, and determine, in a case where the monitoring unit counts the predetermined time without being cleared by the control unit, that the control unit cannot output the instruction to issue the command.

3. The information processing apparatus according to claim 1, further comprising a power control unit configured to, after the monitoring unit has issued the instruction, restart the control unit.

4. The information processing apparatus according to claim 3, wherein the monitoring unit is configured to, after the instruction has been output, instruct the power control unit to restart the control unit.

5. The information processing apparatus according to claim 4, further comprising a switch configured to switch supplying and stopping of power to the control unit,
wherein the switch is configured to, based on the instruction output from the power control unit, enter a state of supplying power to the control unit.

6. The information processing apparatus according to claim 1, further comprising a printing unit configured to form an image on a sheet.

7. The information processing apparatus according to claim 1, further comprising an OFF timer configured to output an instruction to retract the head of the hard disk unit in a case where the control unit cannot complete shutdown processing within a predetermined time,
wherein the hard disk controller configured to receive the instruction from the OFF timer and issue a command for retracting the head of the hard disk unit to the hard disk unit.

8. A method for controlling an information processing apparatus including a hard disk unit, a hard disk controller configured to control an operation of the hard disk unit, a control unit configured to output an instruction to retract a head of the hard disk unit, and a monitoring unit configured to monitor a state of the control unit, the method comprising:
monitoring the state of the control unit, by the monitoring unit;
outputting, in a case where it is determined from the monitoring by the monitoring unit that the control unit is in a state where the instruction to retract the head of the hard disk unit cannot be output, an instruction to retract the head of the hard disk unit to the hard disk controller, by the monitoring unit;
receiving the instruction from the control unit or the monitoring unit, and issuing a command for retracting the head of the hard disk unit to the hard disk unit in a case where the hard disk controller receives the instruction from the monitoring unit, by the hard disk controller; and
retracting, in a case where the hard disk unit receives the command from the hard disk controller, the head of the hard disk unit, by the hard disk unit.

* * * * *